United States Patent [19]

Logan et al.

[11] Patent Number: 4,467,525

[45] Date of Patent: Aug. 28, 1984

[54] AUTOMATED SIGN GENERATOR

[75] Inventors: David J. Logan, Glastonbury; Daniel J. Sullivan, Hartford, both of Conn.

[73] Assignee: Gerber Scientific Products, Inc., Manchester, Conn.

[21] Appl. No.: 401,722

[22] Filed: Jul. 26, 1982

[51] Int. Cl.³ .............................................. B43I 11/00
[52] U.S. Cl. ................................ 33/18 B; 346/139 B
[58] Field of Search ........................... 33/18 R, 18 B; 346/139 C, 139 B, 112, 113, 29, 140 R, 140 A, 136, 79; 83/171

[56] References Cited

U.S. PATENT DOCUMENTS

| | | | |
|---|---|---|---|
| 3,163,936 | 1/1965 | Zuse | 33/18 P |
| 3,465,627 | 9/1969 | Vigneault | 83/171 |
| 3,555,950 | 1/1971 | Gijsbers et al. | 83/171 |
| 3,690,011 | 9/1972 | Burchell | 33/18 B X |
| 3,820,121 | 6/1974 | Rich et al. | 346/140 R |
| 3,857,525 | 12/1974 | Gerber et al. | 346/139 B X |
| 4,319,253 | 3/1982 | Heyer et al. | 346/139 C |
| 4,367,588 | 1/1983 | Herbert | 33/18 R X |

FOREIGN PATENT DOCUMENTS 908458 4/1954 Fed. Rep. of Germany ..... 33/18 R

Primary Examiner—Harry N. Haroian
Attorney, Agent, or Firm—McCormick, Paulding & Huber

[57] ABSTRACT

An automated sign generator produces large scale text on sheet material by means of a cutting tool which is guided relative to the material in accordance with preprogrammed data. The sheet material is supported for movement in one coordinate direction relative to the tool by a feed roller, and the cutting tool is supported for movement in an orthogonal coordinate direction parallel to the roller. Several cutting tools are employed and one of the tools is heated to penetrate through a vinyl sign material that is releasably secured by a pressure sensitive adhesive to a paper release liner. A plotting tool can also be substituted for the cutting tool to plot the sign on plain paper. The sign generator is controlled by a microprocessor and the font from which the sign text is prepared in stored in a ROM memory. A keyboard coupled with the microprocessor is utilized to control the machine operation as well as compose the sign text. Controls are included to edit the character spacing for an aesthetically pleasing appearance and to vary the size and positioning of the font characters.

26 Claims, 22 Drawing Figures

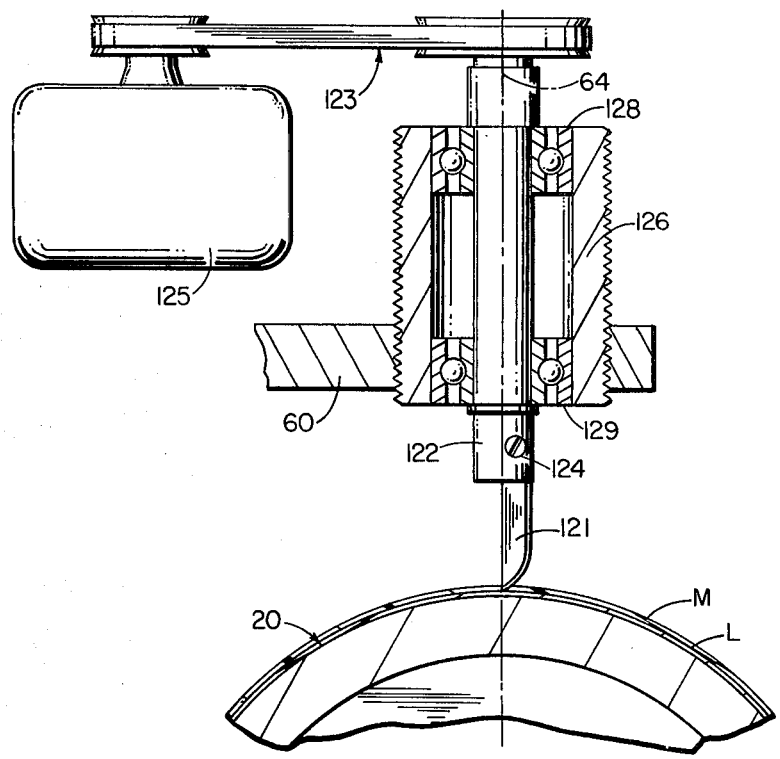
FIG. 10
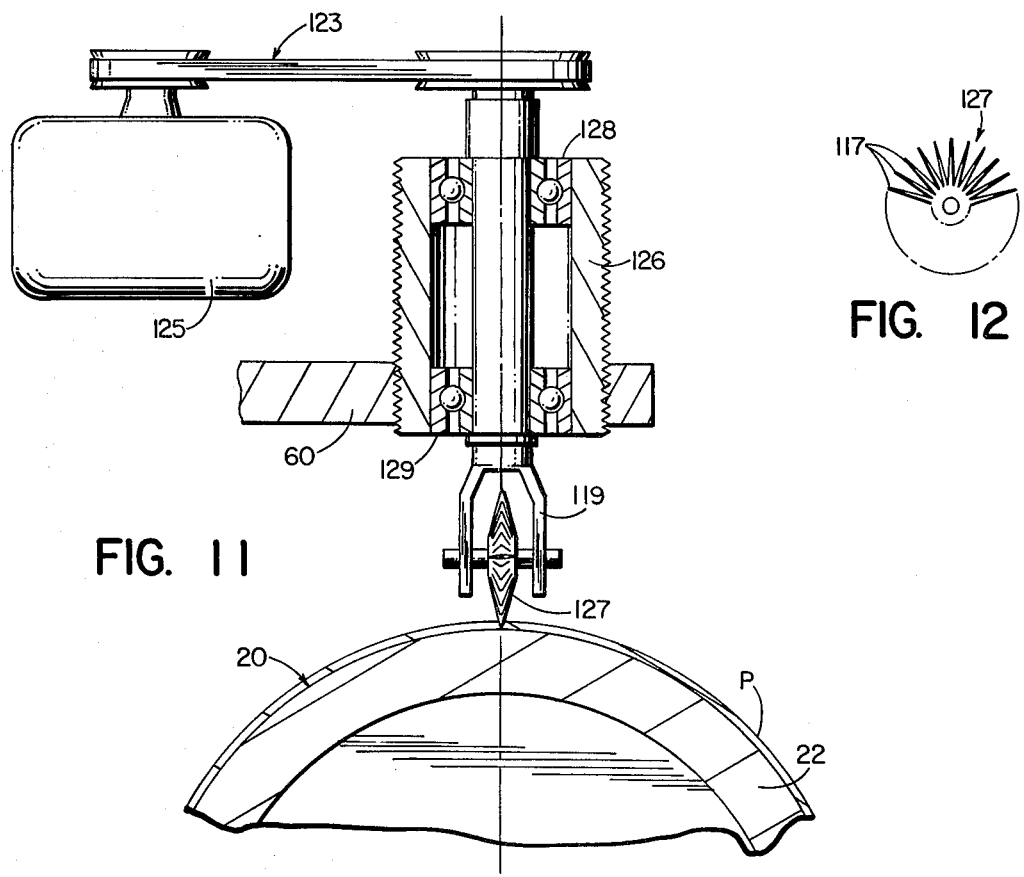
FIG. 11
FIG. 12

$$\frac{Wa + Sa + Wb + 2Sb + Wc + 2Sc + \cdots + Wk + Sk}{L_f} = \frac{L}{L_f} = F$$
FIG. 20
$$\frac{Wa + Sa + Wb + 2Sb + Wc + 2Sc \cdots + Wk + Sk}{2} = \frac{L}{2}$$
FIG. 21
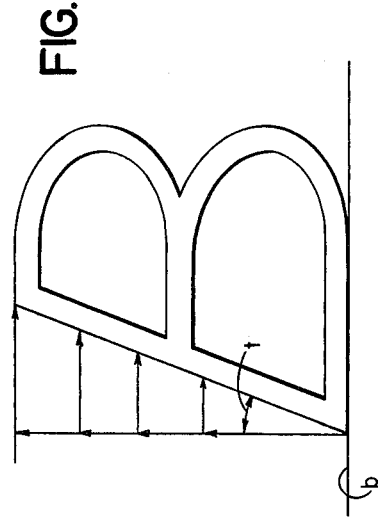
FIG. 22
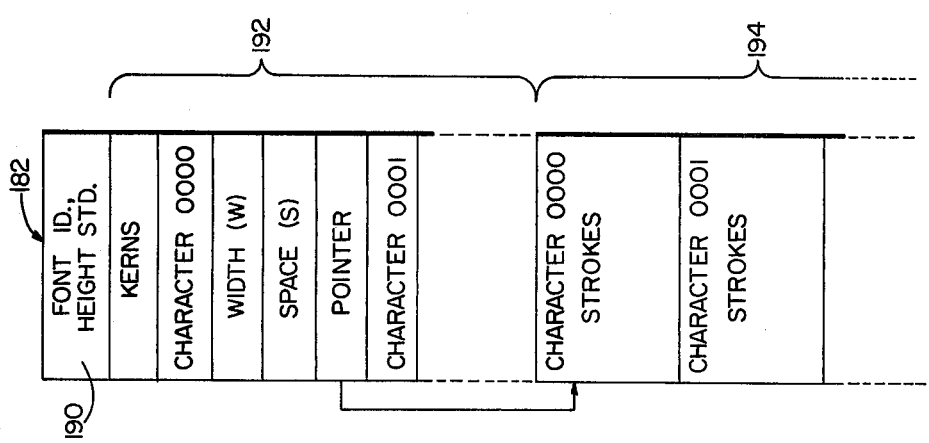
FIG. 16

AUTOMATED SIGN GENERATOR

BACKGROUND OF THE INVENTION

The present invention relates to a sign generator, and is concerned more particularly with a microprocessor-based sign generator that can be used to compose and cut sign text with appropriate control of character spacing and positioning for varied appearances.

Until now, the creation of special purpose signs and lettering for advertising, notices, directions or information has been largely an art form. The text of the sign is laid out manually with appropriate spacing and sizing, and then the text characters themselves are painted or drawn by persons skilled in this particular art. In some instances, die-cut letters can be employed, but the overall layout of the sign is left to the sign maker.

U.S. Pat. No. 3,826,167 describes a more developed sign forming apparatus utilizing heated cutting dies. In this patent, the text of a sign is cut in a thermoplastic sign material adhesively secured to a paper release liner. A strip of the material and liner is fed past a cutting station at which a heated die is pressed through the thermoplastic material to the liner in order to cut a character such as letter as number forming part of the sign text. Through a series of sequential cutting operations a full line of text is prepared on the liner with each character and word spaced exactly as described in the finished sign. The spacing of individual letters is accomplished by means of suitable indicia on the dies and such spacing may be varied if desired for aesthetic or other reasons.

With die cutting systems, the cut characters are limited to the specific configuration of the dies, and changes in height, slant or width of the characters require a totally new set of dies. In addition, the dies must be individually snatched from a heating station, brought into cutting engagement with the thermoplastic material, and then removed to a cooling station so that the die can thereafter be manually handled.

U.S. Pat. No. 3,465,627 discloses another type of hot cutting die for cutting an adhesively-backed thermoplastic film releasably secured to a release liner. The die shown in this patent is constructed of a material suitable for heating above the melting temperature of the film and has a coated cutting surface configured to cut the desired character or pattern in the film.

It is highly desirable to have an automated sign-making apparatus permitting the rapid composition of a sign and the actual generation of the sign characters as they appear in the finished product. Furthermore, it is desirable to provide apparatus for cutting sign text in a wide variety of fonts, character sizes, spacing and appearances without a plurality of separate sets of matched dies. These and other features are general objects of the present invention.

SUMMARY OF THE INVENTION

The present invention resides in an apparatus for generating sign text on sheet material with the same spacing and positioning of text characters as desired in the finished sign. The sheet material may be a thermoplastic material adhesively secured to a release liner for cutting text and transferring the text from the liner to a signboard or other object.

The apparatus includes support means having a support surface for holding the sheet material and the underlying liner during a cutting operation. Cutting means having a cutting tool is suspended over the support surface holding the sheet material for cutting through the sheet material to the liner without cutting through the liner. For cutting the thermoplastic sheet material, the cutting tool may be a heated stylus or blade that rests on the material under a light pressure sufficient to penetrate the thermoplastic but not the liner. The liner thus holds the cut text characters in the same positions and spacing as cut which preferably corresponds to the positions and spacing in the finished sign. A plotting tool may be substituted for the cutting tool to plot the text for proofing or layout purposes.

A program-controlled motor means moves the sheet material with the liner and the cutting or plotting tool relative to one another as the tool generates each sign text character on the material. Memory means is connected with the controlled motor means for storing vectors and other data defining a font of text characters in terms of strokes, and the data is used to guide the relative movement of the tool and the sheet material during the character generating operations.

Text entry means such as a keyboard are provided for selecting the text characters stored in the memory means and establishing the character arrangement and other features in the sign.

In the preferred embodiment, the apparatus has a microprocessor-based design with appropriate interfaces between the text entry means, the memory means and the controlled motor means. The memory means may be a mapped memory having a plurality of fonts which are addressed by the microprocessor through a mapping control. Each font includes an index with pertinent data enabling the microprocessor to expand or contract a line of text in proportion to the available space on a signboard.

BRIEF DESCRIPTION OF THE DRAWINGS

FIG. 10 is a side elevation view partially in section showing a steerable knife blade in the support arm.

FIG. 11 is a side elevation view partially in section showing a steerable pouncing tool in the support arm.

FIG. 12 is a side view of the pouncing wheel in FIG. 11.

FIG. 16 is a schematic illustration showing the construction of a font data store.

FIG. 20 illustrates the algorithm for determining the forced length factor F.

FIG. 21 illustrates the algorithm for determining the justification displacement.

FIG. 22 illustrates a text character modified by the slant algorithm.

DESCRIPTION OF THE PREFERRED EMBODIMENTS

Figures 1, 19:
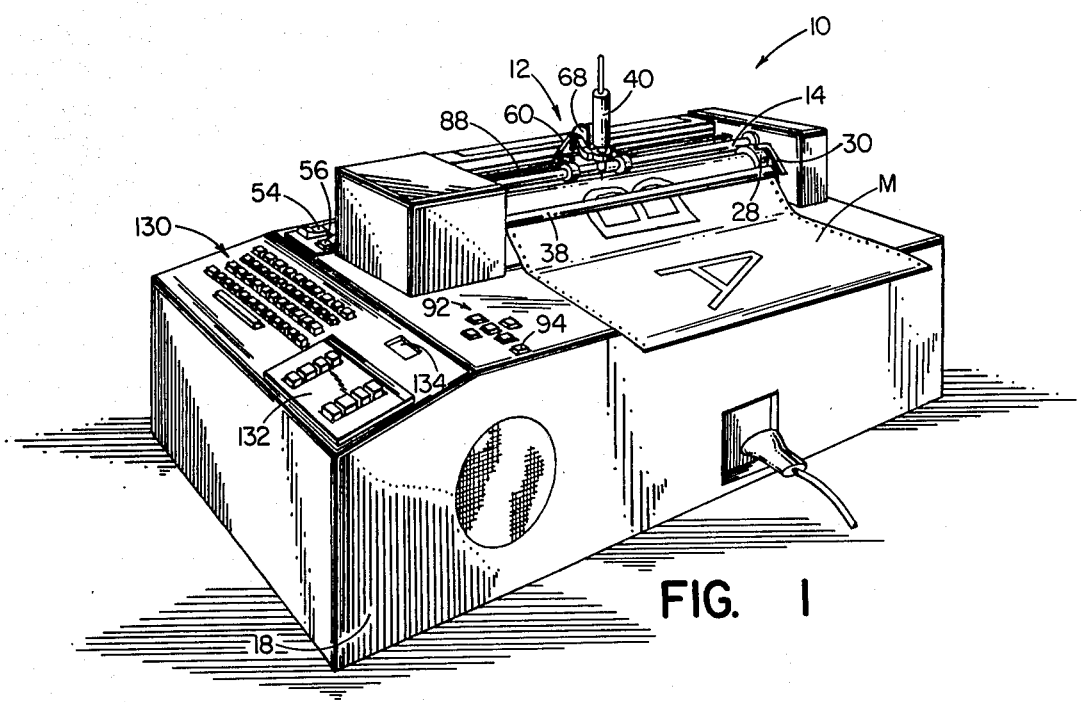
FIG. 1 is a perspective view illustrating the sign generating apparatus of the present invention in one embodiment.
FIG. 19 is a sign in two forms to illustrate the kern feature.
Figure 3:
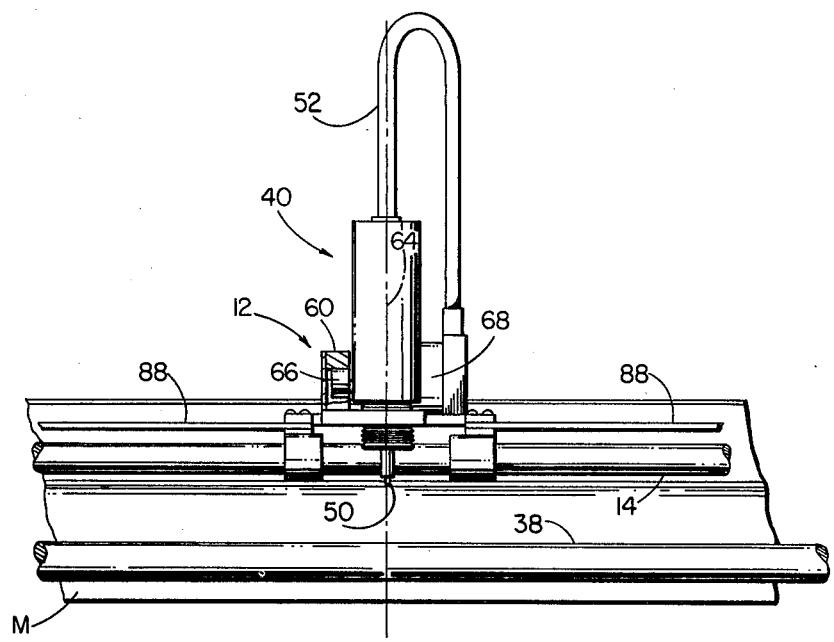
FIG. 3 is a fragmentary front elevation view of the tool head and the material feeding mechanism shown at an enlarged scale.

FIG. 1 illustrates a sign generating apparatus, generally designated 10, for plotting or cutting a single line of text on a sheet material such as plotting paper or a thermoplastic sign material which is adhesively secured to a release liner. One thermoplastic material that is produced especially for signs is a vinyl marketed in various colors under the brand name "SCOTCHCAL" by 3M Corporation and has a thickness between 0.003 and 0.004 inches. The vinyl material is supplied with a pressure sensitive adhesive on one surface, and the adhesive secures the material to a carrier laminate or release liner which may be a 90-pound paper coated with silicone to release the vinyl and the adhesive after cutting.

The apparatus 10 cuts and plots the text of a sign with the spacing and positioning of characters corresponding to the desired spacing and positioning in the resulting sign. The characters cut in sign material may be transferred to a signboard or other object as a group by overlaying the cut characters with an adhesively coated paper that pulls the characters from the release liner. The adhesive on the characters is then exposed and makes possible attachment of the characters to a sign board with the same spacing and positioning as when cut.

The sign generating apparatus 10 illustrated in FIGS. 1 through 4 is a totally integrated machine including not only the mechanical components which cut the sign material M, but also the controls for the mechanical components and the data entry equipment for composing the sign text and executing a sign cutting or plotting operation. In a preferred embodiment of the apparatus 10, the controls and data entry equipment have a microprocessor design.

Figure 2:
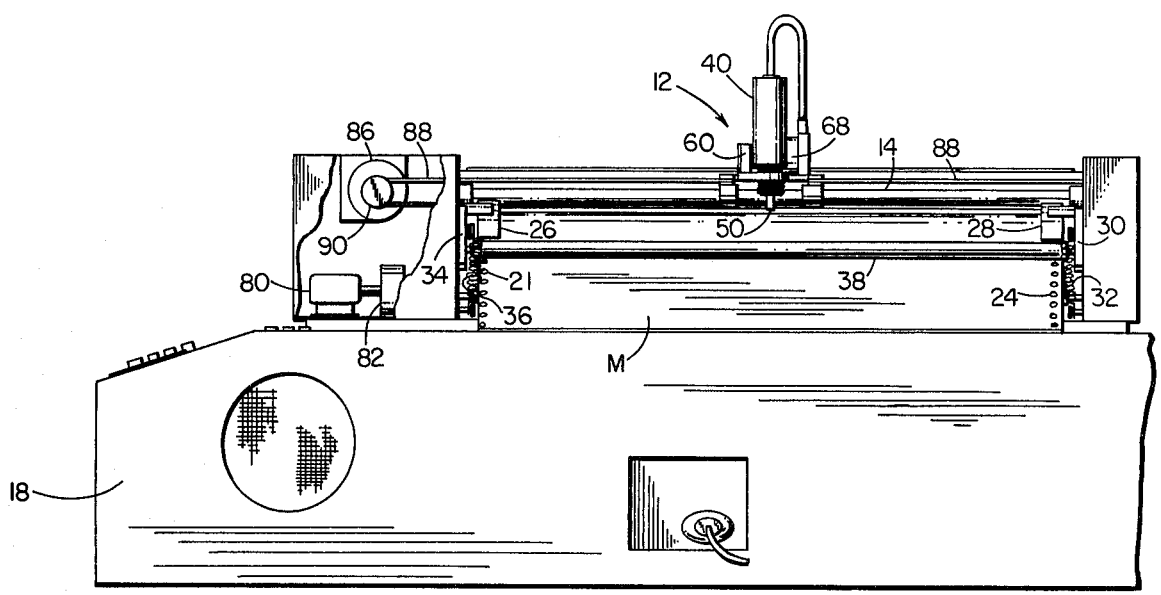
FIG. 2 is a front elevation view of the sign generating apparatus in FIG. 1.
Figure 4:
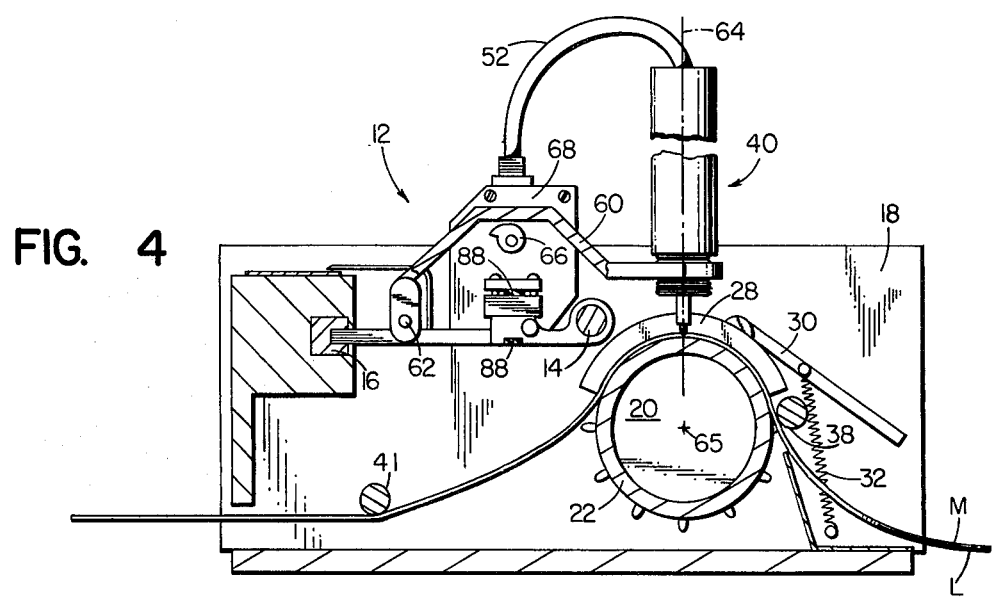
FIG. 4 is a cross sectional view showing the tool head and material feeding mechanism in FIG. 3.

The apparatus 10 has a cutting and plotting tool head 12 which is mounted on a pair of guideways 14, 16 above the case 18 of the apparatus for movement transversely of a strip of the sign material M. The strip is correspondingly fed longitudinally of itself under the cutting and plotting head 12 by means of a feed roller 20 having feed sprockets 21, 24 at opposite ends of the roller for engaging corresponding sprocket holes in the sign material M. To ensure that the sprocket teeth and the holes remain in engagement over a substantial segment of the sprockets, arcuately shaped guide clamps 26, 28 having an arcuate groove straddling the sprocket pins are resiliently biased downwardly against the sheet material at each end of the drive roller 20. FIG. 4 illustrates the clamp 28 pivotally joined to a support arm 30 which is resilient or is in turn pivotally connected to the case 18 and pulled downwardly by a tensioning spring 32. The opposite clamp 26 is similarly mounted and drawn downwardly against the sign material by means of a support arm 34 and spring 36 as shown in FIG. 2. A guide bar 38 extends in front of the feed roller 20 in parallel relationship with the roller to additionally hold the sign material and guide the material on and off of the feed roller as a cutting or plotting operation takes place. A similar guide bar 41 is located behind the feed roller as shown in FIG. 4 for the same purposes. The sign material M can be fed through the apparatus in sheets or from supply rolls or from fan-folded stacks of material at each side of the machine.

Composite movements of the tool head 12 in one coordinate direction parallel to the feed roller 20 and of the sign material on the feed roller in an orthogonal coordinate direction enable two dimensional characters to be created. As illustrated in FIG. 1, letter characters can be formed, but the invention is not so limited and numeral characters and other arbitrary two dimensional sign characters can be created.

Figure 13:
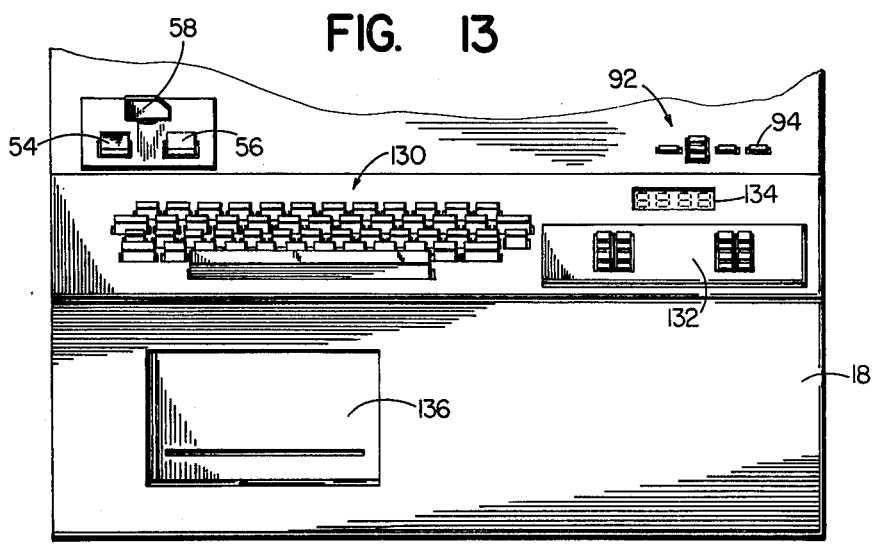
FIG. 13 is a frontal perspective view of the operator keyboards and controls for the sign generating apparatus.

A heated cutting tool 40 is shown mounted in the tool head 12 in FIGS. 1-5 for cutting through thermoplastic sign material M to the underlying release liner L in a sign cutting operation. The cutting tool shown in detail in FIG. 5 includes a body 46 having a heating rod 48 projecting from its lower end and a needle or stylus 50 which receives heat from the rod to cut through the thermoplastic sign material M. Power for the heat is supplied through the cable 52, and the controls for the apparatus shown in FIG. 1 include an on/off switch 54 and a selector switch 56 for high or low levels of heat. Alternately a variable control 58 shown in FIG. 13 can be used to regulate a variable transformer connected with the tool 40 or to switch terminals on multi-tap transformer in stepwise fashion. The heat level selectability is desirable for materials of different thickness and also for various cutting speeds. For example, a thin vinyl is more easily penetrated by the heated stylus 50 than a thicker vinyl, and to prevent the stylus from burning and penetrating the liner L in addition to the vinyl, a lower level of heat is selected. Thus, after cutting, the sign characters remain integrally secured to and are carried by the liner with the same spacing and positional relationship as cut.

Additionally, to limit the penetration of the stylus 50 through the vinyl sign material M to the release liner L, the cutting tool is mounted at the outer end of a support arm 60 which is connected to the rear portion of the head 12 by means of a hinge pin 62 shown in FIG. 4 extending parallel to the roller 20. The arm supports the tool with the central tool axis 64 extending in intersecting relationship with the axis 65 of rotation of the feed roller 20 and serves as a light weight platform allowing the tool 40 to press gently on the vinyl material M under the weight of the tool.

Figure 6:
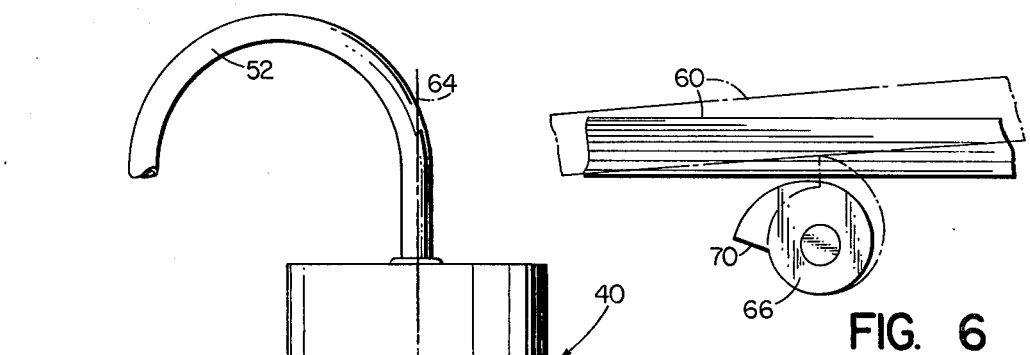
FIG. 6 is fragmentary view showing the support arm for the cutting tool and the lifting cam in both the elevated and lowered positions.

A bridging portion of the arm 60 passes over a rotary lifting cam 66, and the cam is rotated by means of a lifting motor 68 to lower and raise the cutting tool 40 in and out of cutting engagement with the sign material. As shown in FIG. 6, the cam has a lifting lobe 70, and when the lobe is rotated from the solid line position to the phantom position, the arm 60 is lifted along with the cutting tool. Rotation of the lobe to the solid line position disengages the cam and arm to allow the heated stylus 50 to penetrate through the vinyl material under the weight of the cutting tool.

Figure 5:
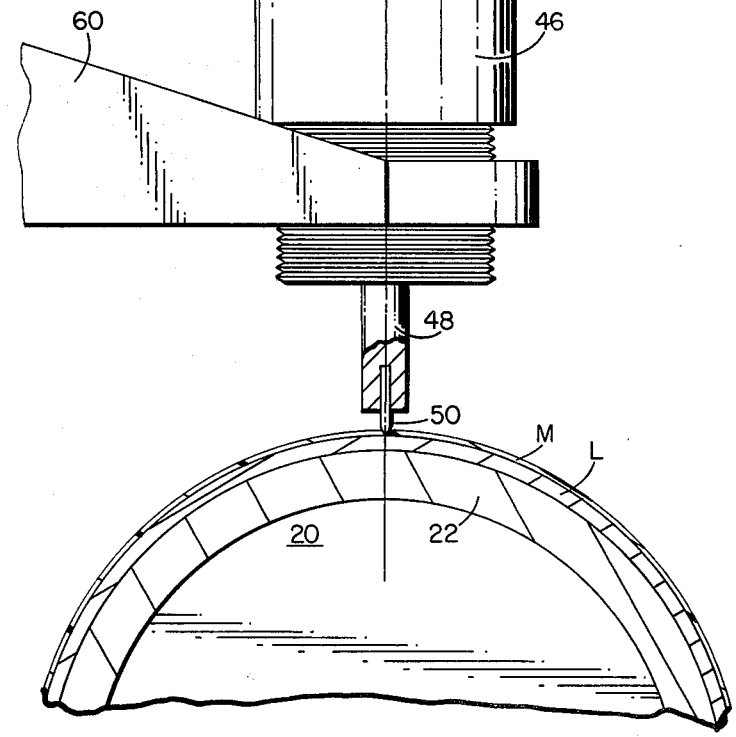
FIG. 5 is an enlarged side elevation view of the heated cutting tool held on the support arm over the feed roller.

As shown in FIG. 5, the feed roller 20 includes a hard rubber outer sleeve 22 which defines the support surface underlying the sign material M and liner L during a cutting operation. The sleeve is rigidly secured to the inner portion of the roller for rotation about the roller axis and the support surface of the sleeve extends circumaxially about the roller axis to hold and position the sheet material properly for working by the tool.

The feed roller 20 is rotatably driven by means of a servomotor 80 shown in FIG. 2. The motor is connected in driving relationship with the roller through a gear reduction unit 82 and is actuated in response to command signals from a microprocessor described below to move the material back and forth under the cutting tool 40.

The tool head 12 comprises a tool carriage that is moved back and forth on the ways 14, 16 by means of another servomotor 86 and a tool head drive belt 88 threaded around pulleys 90 (only one shown) at opposite ends of the ways. The one end of the drive belt connects with the tool carriage at one side and the other end of the belt connects with the carriage at the opposite side as shown most clearly in FIG. 3. The servomotor 86 moves the tool 40 back and forth relative to the sheet material and feed roller in response to command signals from the microprocessor. Both of the servomotors 80, 86 include position transducers for accurately locating the cutting tool on the sign material at each point along the cut contours which outline the sign characters as shown in FIG. 1. Additionally, the lift motor 68 receives command signals to move the tool in and out of cutting engagement with the material in conjunction with the controlled displacements produced by the servomotors 80, 86. Control cables for the lift motor and also for supplying power to the heated cutting tool 40 are preferably in the form of a ribbon wire which may roll and unroll in a trough supported adjacent the head as the head moves back and forth over the feed roller 20.

The group of five switches 92 shown on the case 18 in FIG. 1 enable the servomotors 80, 86 to be manually energized for disengaging the automatic controls and slewing the cutting tool 40 to any desired position over the sign material M. Each of the switches is associated with either the material or the cutting tool. Two of the switches move the material in one direction or the other under the cutting tool, another two of the switches move the cutting tool in one direction or the other on the ways 14, 16, and the fifth switch is used to raise and lower the cutting tool. A scale may be fixedly attached to the case 18 in parallel relationship with the ways 14, 16 to allow the plotting and cutting head 12 to be manually slewed more accurately to given positions along the feed roller 20. A sixth switch 94 is provided to operate the cutting tool 40 in a tool-down position and separate one portion of the material enveloping a sign from the surrounding material.

Figure 7:
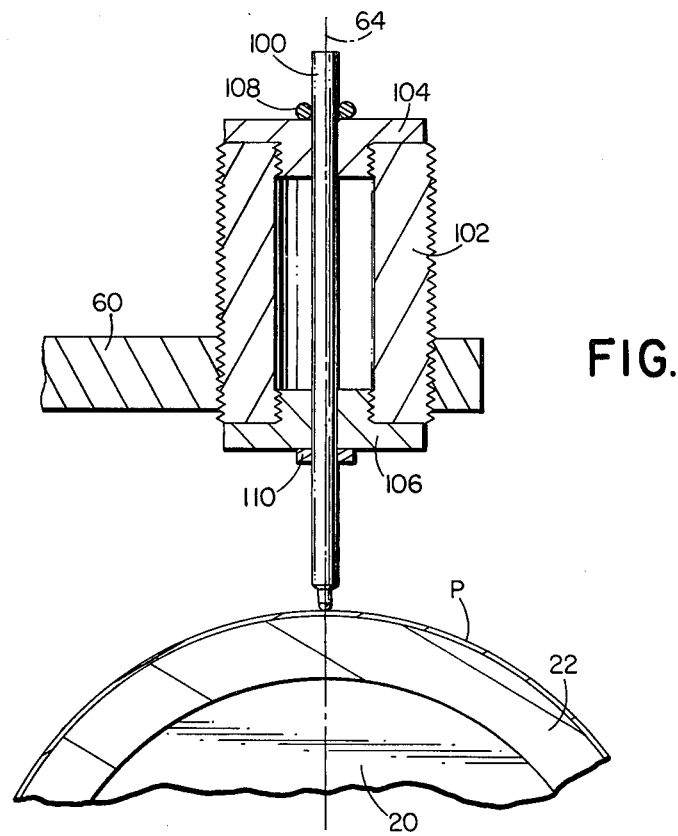
FIG. 7 is an enlarged side elevation view partially in section showing the plotting tool substituted in the support arm in place of the cutting tool of FIG. 5.

The plotting and cutting head 12 is adapted to support not only the cutting tool 40, but also a plotting tool 100 as shown in FIG. 7. It will be observed, for example, in FIGS. 5 and 7 that the tools are threadably secured in an aperture at the projecting end of the lifting arm 60 along a common tool axis 64. The plotting tool 100 is typically a pressurized ball point pen, and is held in the arm by means of a threaded bushing 102 having two screw caps 104, 106 at opposite ends. An elastomeric ring 108 tightly surrounds and secures the pen adjacent the upper cap 104 to lift the pen away from the feed roller 20 when the lifting arm 60 is raised. A snap ring or ferrule 110 surrounds the pen adjacent the lower cap 106 to apply downward pressure to the pen through springs or the weight of the arm and bushing to mark a plotting paper P trained over the feed roller 20 on the hard sleeve 22. The sleeve serves as a hard backing material to permit the pen to produce marks on the paper as relative movement between the pen and paper is produced manually through the switches 92 or automatically through the microprocessor. If necessary, holddown springs may be connected with the lifting arm 60 to ensure that the plotting pen is urged into engagement with the plotting paper with sufficient pressure to produce a mark on the paper.

The tool head 12 which permits both cutting and plotting tools to be used interchangeably on different work materials is advantageous in the sign making apparatus since the pen permits a programmed sign to be previewed on relatively inexpensive plotting paper P prior to actually cutting the sign text in the more expensive sign material M adhesively secured to a release liner. Previewing the sign and the operation of the apparatus allows the machine operator to eliminate errors and make fine adjustments in the positioning and spacing of the text characters with minimal expense. Even if the cost differential between the sign material and plotting paper were not significant, the interchangeability of the cutting tool and the plotting tool is desirable because the plotting tool can be moved at a much higher speed than the cutting tool and thus proofing steps can be performed in a much shorter period of time when than the actual cutting of the sign.

Figure 8:
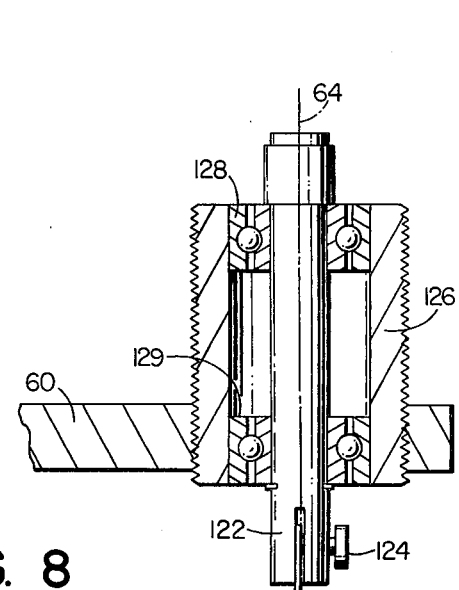
FIG. 8 is a side elevation view partially in section showing a knife blade cutting tool in the support arm in place of the heated tool of FIG. 5.
Figure 9:
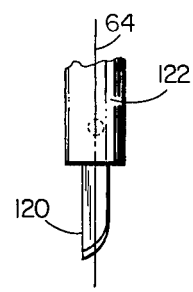
FIG. 9 is fragmentary side elevation view of the knife blade cutting tool in FIG. 8 from another side.

FIGS. 8 and 9 illustrate another cutting tool 120 that may be mounted in the lifting arm 60 in place of the cutting tool 40 and the plotting tool 100. As illustrated, the cutting tool 100 is comprised by a small scalpel blade which has a sharp cutting edge at its depending end. The blade is held in a chuck 122 by means of a clamping screw 124. The chuck is held in a threaded bushing 126 by means ballbearings 128, 129 so that the scalpel blade will freely rotate about the tool axis 64 as the directon of the cut in the sign material M is varied. It will be observed, for example, in FIG. 9 that the lower tip of the cutting edge is offset from the tool axis 64 and in this configuration, the lower edge is rotated into a trailing position behind the axis 64 in alignment with a line of cut as changes in direction take place.

The scalpel or knife blade 120 may be used in place of the heated stylus 50 in FIGS. 1-4 to cut large size characters in which small fillets or rounds caused by the rotations of the blade are not critical. The knife blade 120 is preferable for large characters because the maximum cutting speed of the scalpel is much greater than the heated stylus and the total time to cut a large character is correspondingly reduced. With small characters, however, the overall time is not significantly affected by the lower maximum speed of the heated stylus, and the ability of the stylus to accurately produce fine detail is clearly superior to the knife blade.

In the event that precise, sharp corners are desired in the large-size characters instead of fillets or rounds produced by the freely rotated knife blade 120, an oriented cutting blade 121 may be utilized in the tool head 12 as shown in FIG. 10. The blade 121 has a sharp leading cutting edge in the same manner as the knife blade 120, but the blade 121 is positioned with the lowermost tip substantially concentric with the tool axis 64. Additionally, the upper end of the chuck 122 is connected through a system of pulleys and toothed drive belt 123 with an orientation servo motor 125 mounted on the tool head. The servo motor receives blade orientation signals from the microprocessor to orient the blade in the direction of relative movement produced by the servo motors 80,86 connected with the roller 20 and the tool head, respectively.

In addition to the cutting and plotting tools described in FIGS. 5-10, other tools such reciprocating needles and spark gap tools may be used for pouncing or perforating materials along the profile of each sign character. Pouncing is sometimes employed by sign makers for dusting the outline of the letters onto a sign board or other object. The object is covered with an appropriately perforated overlay and then dabbed with a dusting pad to deposit slight traces of dust through the perforations on the object along the outline of the characters. The stylus 50 without heating and the lifting motor 68 may be operated as a pouncing tool. By running the motor continuously, the lifting cam 66 and a holddown spring (not shown) reciprocate the support arm 60 and the stylus in a cyclic manner and produce a series of perforations along the outline of a character traced by the tool head 12 and feed roller 20.

Another pouncing tool employing the orientation motor 125 of FIG. 10 and a steerable yoke 119 in the bearings is shown in FIGS. 11 and 12. The tool includes a pouncing wheel 127 having a plurality of radially extending needles or punch pins 117 which are pushed through a plotting paper P or similar material as the wheel rolls to produce the series of perforations outlining the sign characters. Relative movement between the wheel and paper is controlled by the servo motors 80,86 in the same manner as in plotting or cutting to mark the character outlines, and the orientation motor 125 ensures that the wheel 127 is properly oriented at each point of a contour.

Thus, the sign making apparatus 10 offers the versatility of interchangeable tools for a variety of operations associated with the production of signs.

PROGRAMMING AND CONTROL

The sign generating apparatus 10 in the preferred embodiment of FIG. 1 has a microprocessor-based design with a data keyboard 130 for entering the sign text, a function control keyboard 132 for controlling data entry and machine operations and a visual display 134. The data keyboard 130 is similar to a standard typewriter keyboard and enables the machine operator to identify the sign text characters and compose the text of a sign from a selected font of characters. The font of characters may be stored in terms of the various strokes in a memory disc or other device that is read through a drive unit into a random access memory (RAM) associated with the microprocessor, or a plurality of fonts may be built into the apparatus in a series of ROM's (read only memories).

Figure 14:
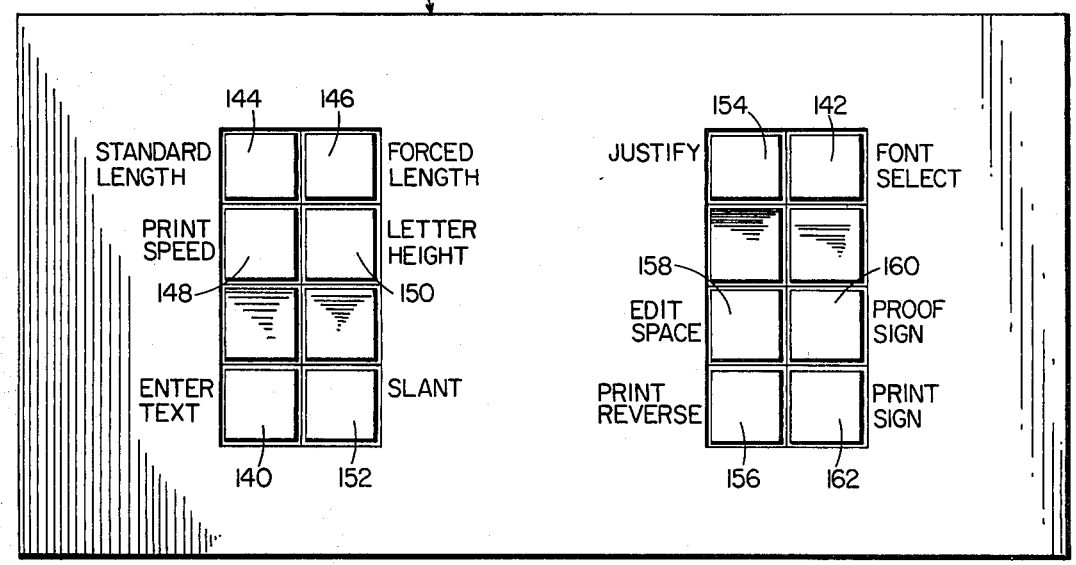
FIG. 14 is an enlarged view of the function keyboard shown in the controls of FIG. 13.

FIG. 14 shows the function keyboard 132 in greater detail and lists the various functions that can be controlled by the machine operator. Key 140 is pressed to place the machine in the mode for entering text through the data keyboard 130. In this mode of operation, the operator can enter a full line of the sign text limited only by the memory capacity of the hardware. During the text entry mode the entered characters appear in the LED display 134 as the keys are pressed, and through a scrolling process, the most recently entered characters remain in view if the length of the text exceeds the capacity of the display. While text is entered, the tool head 12 and the feed roller 20 are inoperative.

The sign generating apparatus also includes features which allow the machine operator to select special characteristics for the text of the finished sign during the text entry mode of operation.

For example, if the apparatus is provided with a plurality of fonts, the operator must press key 142 and then identify by appropriate code number through the keyboard 130 the font which is to be utilized. Upper case and lower case letters if provided in any particular font are selected with shift keys in the keyboard 130 in the same manner as in conventional typewriters.

After the font has been selected, the the operator may select either the standard length key 144 or the forced length key 146. Pressing key 144 permits the operator to specify that the line of text will be printed or drawn at a standard length determined by the cumulative sum of the selected character widths and spaces programmed in the selected font. That length is also shown in the display if text has been entered. Pressing the forced length key 146 enables the operator to key in from the data keyboard 130 and display a desired length in which the line of characters must be compressed or stretched. This feature is advantageous in creating signs where the operator wishes to fill a particular window or space on the object where the text will appear or where the space is limited. The operator simply keys in the desired or forced length of the text, and the microprocessor automatically produces the text at the desired length as described in greater detail below.

Through key 148 and the appropriate data keys on the keyboard 130, the operator sets the percent of maximum speed at which the tool and sheet material move relative to one another. As mentioned above, when the knife blade 120 is employed, a higher cutting speed is possible and when the plotting pen 100 is employed, an even higher maximum speed is permitted.

Key 150 is similar in function to key 146 but allows the operator to key in from the data keyboard 130 and display the height of the letters in the sign. If no specific height is specified during the data entry portion of the machine operation, then the letters are cut or drawn at a standard height, for example one inch, programmed in the font.

A key 152 and appropriate data keys cause the text characters to be inclined by a selected amount to the right which gives the characters an appearance similar to italics. The entered angle of inclination is shown in the display.

The justify key 154 allows the machine operator to position several lines of text in a prearranged position relative to one another. For example, each line of text may be aligned along either the right or left hand margin, or several lines may be centered on one another as explained in greater detail below.

A key 156 reverses the programmed displacements of the tool head and material along the one coordinate parallel with the line of text (in the illustrated embodiment, the displacements produced by the feed roller 20) and causes the characters to be printed with a reversed or mirror image as shown, for example, in FIG. 1. Reversed images are frequently necessary where the adhesively secured vinyl must be attached to the inside of a transparent object such as a window and be viewed from outside or where the sign is commonly viewed through a mirror such as the front panel of an emergency vehicle.

Key 158 enables the machine operator to change the preprogrammed spacing of adjacent characters on a selective basis in order to produce an aesthetically pleasing appearance of the text. This feature is described in greater detail below in connection with the example shown in FIG. 19. The key 160 causes the entered text to be cut or drawn on sheet material by means of the tool head 12 at a standardized size, for example, one inch high letters at standard lengths. Typically, key 160 is utilized to preview a composed sign when the plotting tool 100 is installed in the tool head and a plotting paper is moved under the head by the feed roller 20.

Lastly, key 162 is utilized to cut or plot the sign text in final form with all of the special features including a forced length, special letter height and slant if commanded.

Figure 15:
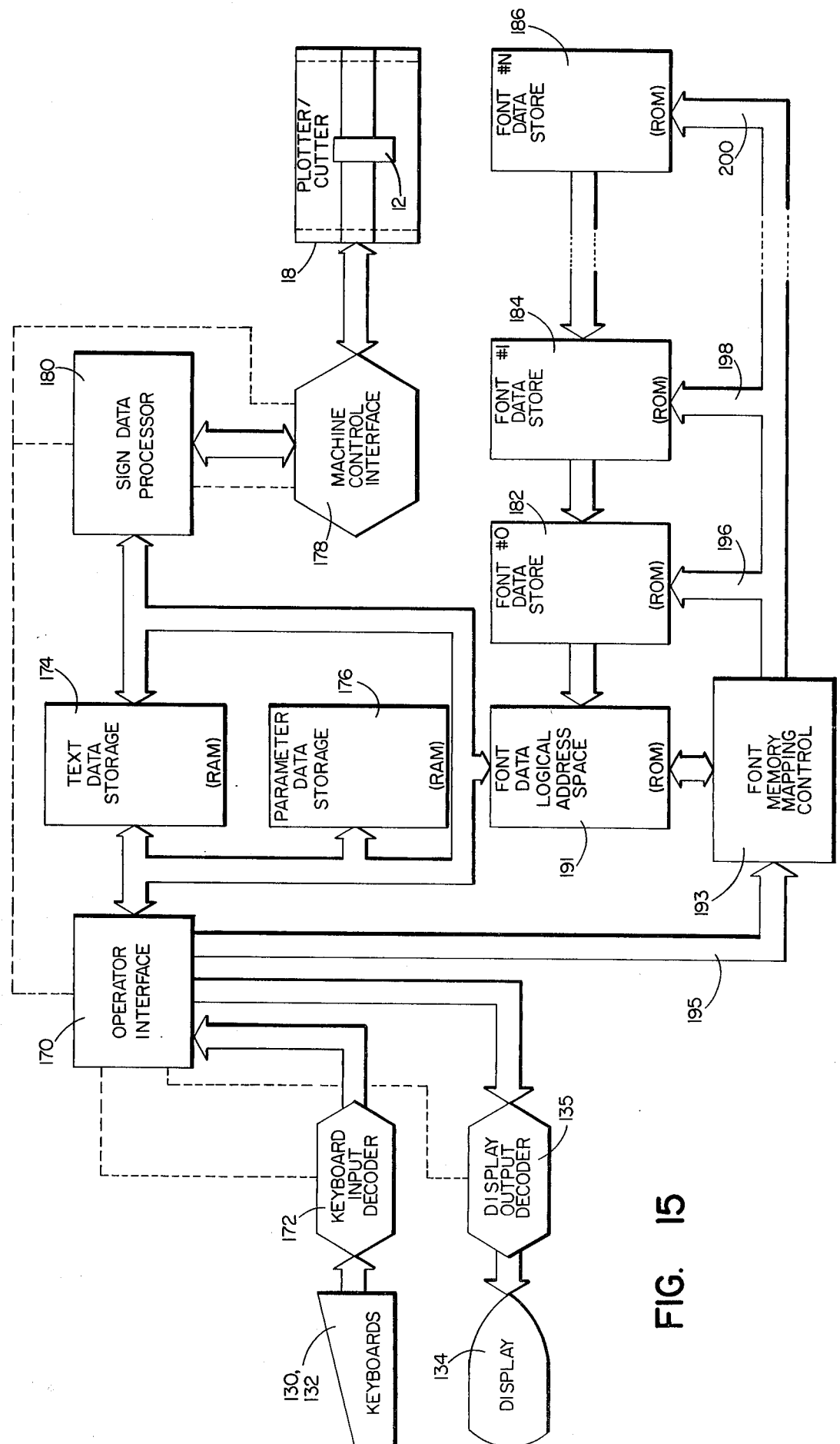
FIG. 15 is a diagram showing the control system of the sign generating apparatus.

FIG. 15 is a diagram illustrating the general configuration of a microprocessor based design for controlling the operations of the sign generating apparatus. The various functional components of the processor are illustrated separately; however, in actual structure, a single microprocessor such as a Model Z8002 manufactured by Zilog of Cupertino, Calif., is capable of forming the illustrated data processing functions with supplemental memories for the various fonts, text and commanded data. The machine program memory is not illustrated but typically a 48K ROM is used and has sufficient capacity for the machine program with the functions illustrated and described in FIGS. 15 through 22.

Figure 17:
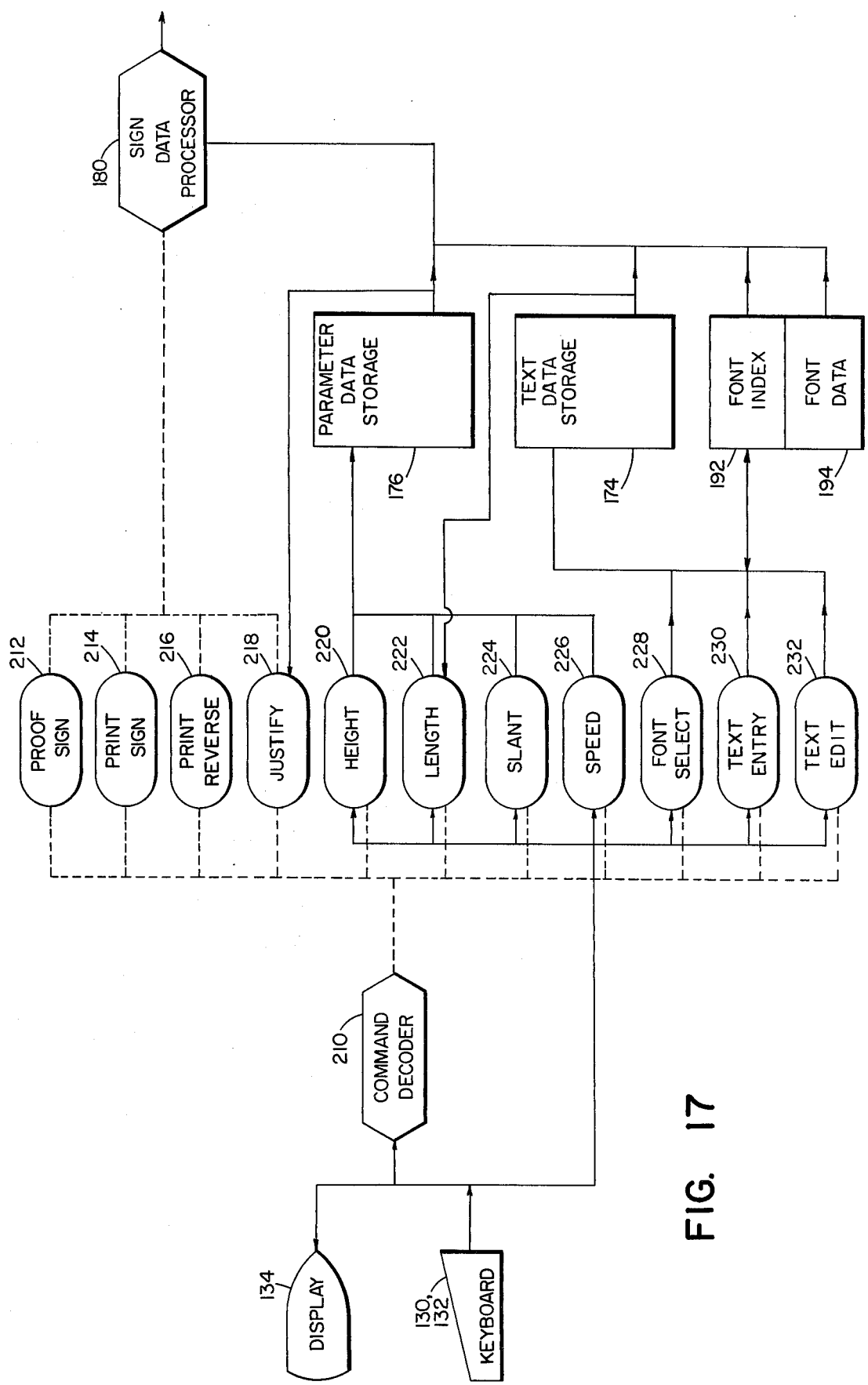
FIG. 17 is a diagram illustrating the control and data flow channels through the operator interface to other components in the control system.
Figure 18:
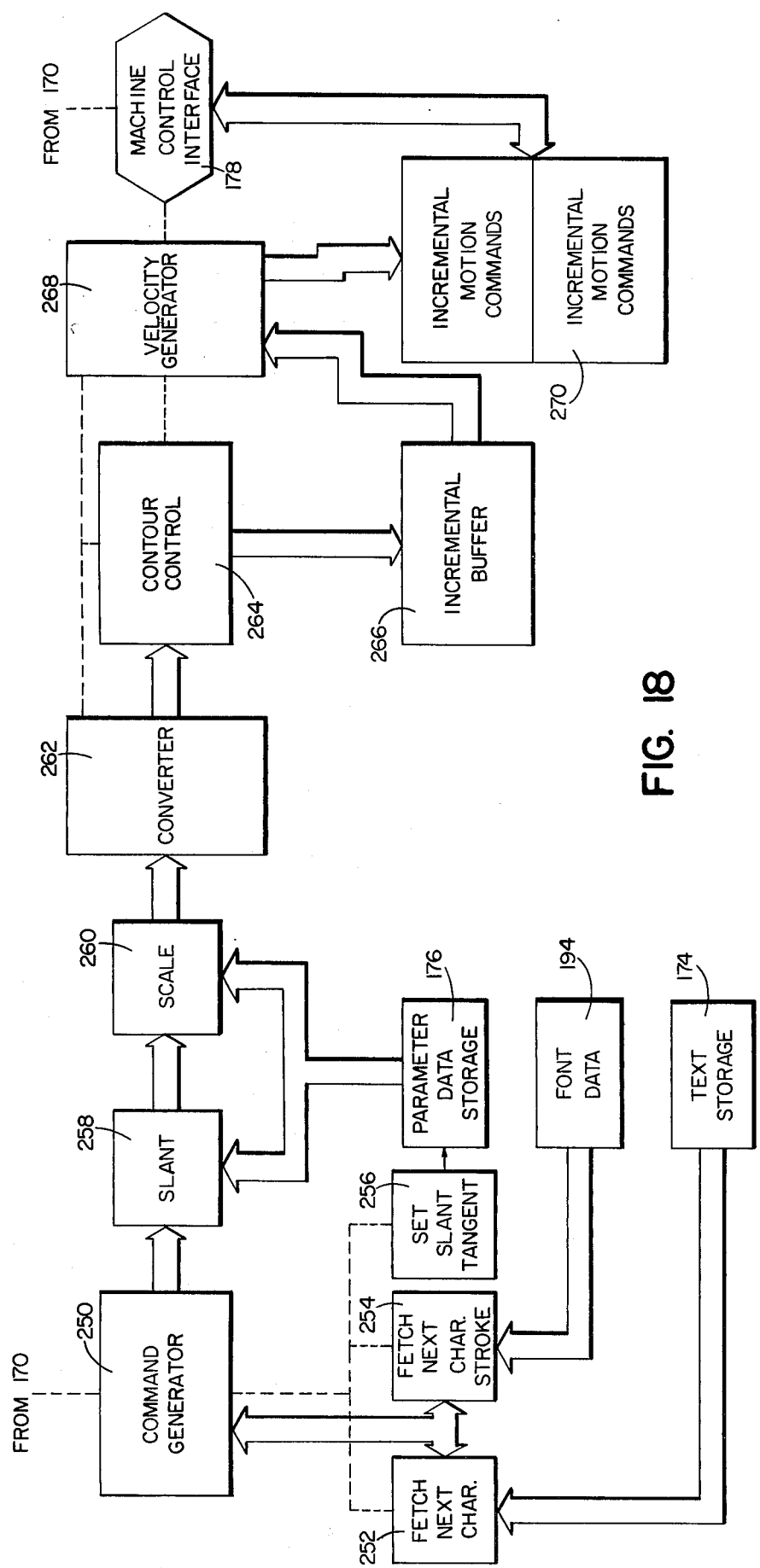
FIG. 18 is a diagram illustrating the various components of the sign data processor in the control system.

In FIGS. 15, 17 and 18, the dashed lines between various functional components represent command signal channels and the broad bands represent busses for transmitting addresses and data between the functional components. For example, keyed input data from the keyboard 130 passes between the keyboard input decoder 172 and the operator interface 170 along with command signals from the function keyboard 132 which are also interpreted by the decoder. However, addresses and data only flow between the operator interface, the text data storage memory 174 and the parameter data storage memory 176.

The operator interface 170 serves as the primary control component for handling both data and commands between the keyboards 130, 132 and the rest of the microprocessor. Additionally, the operator interface responds to a portion of the machine program to cause the display output decoder 135 to operate the LED display 134 with appropriate data in accordance with the functions selected by the operator through the function keyboard 132.

The text data storage memory 174 receives and holds the text characters as they are keyed in by the operator from the keyboard 130, and then supplies the stored text to the sign data processor 180 during the execution phase of the machine operation when the tool head reduces the data to a visually manifested form on either sign material or plotting paper. Typically, the memory 174 is a random access memory and in one embodiment, the memory has an 8K storage capacity which is sufficient to hold a line of text consisting of 255 characters.

Similarly, the parameter data storage memory 176 receives the parameter data entered from the keyboard 130 as the machine operator initially sets the various machine parameters such as speed, letter height, line length and slant angle. The memory 176 is a random access memory and in one embodiment has an 8K storage capacity.

The embodiment illustrated in FIG. 15 includes a plurality of font data stores 182, 184, 186, each of which contains all of the data defining one complete font of text characters of data defining designs, symbols such as logotypes or trademarks which are frequently desired in the sign in addition to more conventional text characters. In the context of this application, reference to sign text or text characters should be interpreted to include such special designs as well as the more conventional letters, numbers and punctuation marks.

FIG. 16 illustrates schematically the construction of the font data store 182. A header portion 190 of the store which is accessed by the operator interface contains an identifying code and certain standardized information for all of the font characters in that store. For example, the height standard represents a reference from which the heights of all of the font characters are proportioned. All of the upper case letters may have the same height as the height standard while a lower case "a" may be one third of the height standard and a lower case "b" may be two thirds of the height standard.

Following the header portion 190 is an index portion 192 which includes the kerns to adjust the standard spacing that is otherwise provided for in the font data. A kern constitutes a separate character in the data forming a line of text and functionally is analogous to an incremental backspace. Several kerns of different lengths are included in each font.

The major portion of the index portion 192 comprises a listing of each character of the font together with certain geometric information about the letter and a pointer identifying the address in the bulk data file 194 of the store where the strokes or vectors fully defining the profiles of the letter are located. The division of the font store into an index and bulk data file reduces the access times for the data and enables faster processing of information when certain specialized functions such as the "justify" or "forced length" features are commanded. In the index 192, each letter or other character is identified by an ASCII numeral code to permit access through the operator interface 172 from the keyboard 130. Also included with the code is the dimensional width of the letter at the same scale as the height standard in the header portion 190, and a space dimension which is added before and after each letter to provide appropriate spacing between most combinations of letters. In some instances, however, certain combinations of letters do not appear properly spaced with the programmed space, and in such instances, the kerns are utilized to provide a sign that is more aesthetically pleasing to the eye.

When the operator composes sign text and orders a specific character from a font during a text entering operation, direct access to the character is obtained in the index through the character code. Only the index data is loaded into the text data storage memory 174 addressed in logical sequence with the appearance of the characters in the text. The stroke data in the bulk data file 194 is not needed in the memory and is not utilized until execution of the plotting, cutting or pouncing commands.

Generally, the microprocessor from which the operator interface 170 is formed does not have sufficient address capacity to access each address in the data memory 174, the parameter data memory 176 and all of the font data stores. For this reason, the microprocessor-based design of the sign making apparatus includes a mapped memory system which gives the interface 170 access to selected fonts or segments of a font through a logical address space 191 at any given point in time. The logical address space is not a true memory device in contrast to the memories 174, 176. Instead, the space 191 represents an addressing capacity of the interface through a limited number of data ports. Thus, at a given point in time the interface can address and load only a segment of the data in a given font data store into the text data memory 174.

Because the interface 170 has an address capability that is less than that required to reach the data in each of the memory stores, a font memory mapping control 193 is included between an address buss 195 connected with the interface 170 and the several busses 196, 198, 200 for accessing the font data in each of the stores. In operation, the address information on the buss 195 identifies the font or segment of a particular font from which data is desired, and the mapper 193 insures that the desired font or segment of the font is addressed through the logical address space 191 by the data buss associated with the memory 174 and the data processor 180. As a result of this mapping technique, multiple fonts may be stored in ROM's within the sign generating apparatus, and the operator has a much broader selection of text characters for use in a sign.

FIG. 17 illustrates very generally the command signal and data flow channels through the operator interface 170 for the various commands and pieces of data that can be ordered by the machine operator with the aid of the keyboards 130, 132. Within the operator interface 170, a command decoder 210 accepts the command signals from the function keyboard 132 and processes those signals in accordance with subroutines corresponding to the various functions designated on the board. For example, the signal produced by key 160 in FIG. 11 is decoded and is directed to the proof subroutine 212 to activate the program in the sign data processor and generate the entered text at the standardized scale without regard to the specially commanded height, length or slant commands that are desired in the finished sign. The finished print sign signal when commanded activates the subroutine 214, and in that event, the program of the sign data processor 180 engages all of the relative positioning and data features which have been commanded and stored in the data memories 174, 176 through the data encoding circuits 220, 222, 224, 226 and the text encoding circuits 228, 230, 232. It will be observed that each of the encoding circuits receives command signals from the decoder 210 and data signals from the keyboard 130. For example, if a forced length has been commanded, the decoder 210 activates the forced length encoding circuit 222 and the desired length of the line of text is entered as data from the keyboard 130 in the parameter memory 176. During the data entry portion of the machine operation, the forced length data is merely stored in memory and no modification of the text data, if entered, occurs. Similarly, commanded height, slant and speed data is merely encoded for storage and future use after a print command is received by the subroutine 214 or alternatively the reverse subroutine 216.

The text entry function and data flow is performed in a manner different from the parameter data entry steps described immediately above. The selected font is identified by an appropriate code through the subroutine 228, and the code is stored in the text data memory 174. At the same time, of course, the memory mapper (not shown) associates the memory 174 with the corresponding font store or font segment having both an index 192 and bulk data portion 194. As text is keyed into the keyboard 130, only the identifying data in the font index 192 is placed in the text data memory. In the preferred embodiment the data held in the index is sufficient to perform all of the functions associated with the justify routine 218 and the forced length routine 222 which may be ordered prior to actual printing of a sign. The bulk data defining the character strokes in the bulk data portion 194 of the store memory is not utilized during the data entry portion of the sign generating operation.

The justify command handled in the subroutine 218 requires the space and width data taken from the font index and stored in the parameter memory 176 prior to execution of a sign plotting or cutting operation. The justify command allows several lines of text to be aligned with one another along either a right or left hand margin or a centerline. The justify alogrithm performed within the subroutine 218 and providing these functions is shown in FIG. 21 and is a simple addition and division calculation to determine a justification displacement for positioning the tool head 12 and sign material M prior to or following the generation of each line of text. The justification displacement is half of a line length and may be determined from the sum of all of the widths (W) of the designated characters plus the spaces (2S) located before and after each intermediate character plus the space (Sa) after the initial character and the space (Sk) before the last character. If a kern is inserted in the text, then the dimension of the kern would be subtracted from the sum. This sum represents the overall length L of the line text as printed assuming that the line is not being forced into a particular line length. In the latter event, the compressed or expanded length is used rather than the standard length L.

The length L is then divided is half and the feed roller 20, which establishes the base line coordinate in the disclosed embodiment, is energized to displace the sheet material one half of the line length from a desired line end toward the beginning of the line. At this point, the plotting or cutting tool on the tool head 12 is situated at the midpoint of the line of text in memory which is either about to be cut or has already been cut. If the text is yet to be cut, the justification key 154 in FIG. 11 is pressed a second time and the feed roller moves the sheet material another equal increment so that a plotting or cutting operation may be started and the line of text will be centered at the referenced midpoint.

A second line of text can be centered on the first by pressing the justification key 152 again after the text has been cut or plotted and before the second line of text is entered which moves the material back to the centered position in the first line of text. The second line of text is then entered and the justification key 152 is pressed to displace the sheet material by one half of the length of the second line. The tool head 12 may then be manually slewed on the ways 14, 16 to a second base line position below the first line of text, and the second line of text can be plotted with the text centered under the first line.

The process can be repeated for as many lines of text as will fit on the strip of sign material M.

The justify feature may be used to provide right hand justification of multiple lines by pressing the justification key twice after the text of each line has been entered but before the text is plotted or cut. Justification at the left-hand margin is achieved by pressing the justification key twice after the text of each line has been cut or plotted but before the text of the next line is entered. In any case, justification of the lines of text at the center or the margins is accomplished through the use of the same algorithm shown in FIG. 21.

The forced length algorithm utilized by the subroutine 222 is shown in detail in FIG. 20. This algorithm also utilizes the space and width data stored in the text memory 174 to determine the standard line length L in the same manner as the algorithm in FIG. 21. Additionally, the forced or commanded length Lf is divided into the standard length L to determine the length factor F. This factor is stored in the parameter memory 176 and is later utilized by the data processor 180 during a cutting or plotting operation.

The text edit subroutine 232 introduces a kern or incremental backspace into the line of text whenever the kern key of the keyboard 130 is pressed in a manner analogous to the insertion of a space when the space bar is pressed. The kern is equivalent to a backspace and subtracts an incremental amount of space between any two letters. The algorithm within the text edit subroutine 232 causes the display 134 to present two of the text characters which the operator has identified through the data keyboard 130 and wishes the position in closer relationship for aesthetic or other reasons. FIG. 19, for example, illustrates the name DAVID in two forms. In the upper form the name appears with the normal letter spacing established in the font index. It will be observed that the letters AV appear to be too far apart; however, this illusion arises because the adjacent sides of the letters A and V are slanted and in parallel relationship which to the eye adds to the programmed spacing.

In this event, it is desirable to introduce between the letters one or more kerns which are represented in the lower form of FIG. 19 by the arrow 238. The kern character subtracts an incremental space to locate the letter V closer to the letter A, and if desired, the kern may be pressed a number of times to move the second letter of an identified pair into contacting relationship with the first letter to form a ligature, or two letters may actually be placed on top of one another such as a hyphen and the letter "O" to form composite characters.

In response to the commands from the subroutines 212, 214, 216 and 218, the sign data processor 180 draws data from the memories 174, 176 and font store portions 192, 194 and produces the motor commands that energize the servomotors 80, 86 and produce relative movement between the tool and the head 12 and the sign material M.

A detailed diagram of the sign data processor 180 of FIG. 15 and its connection with the machine control interface 178 between the processor and the servomotors is illustrated in FIG. 18. Data from the memories 174, 194 enters a command signal generator 250 which sequentially generates absolute position and tool commands in accordance with the stored data and text and the machine program when proof, print, or justify commands are ordered by the operator. One of the machine program instructions 252 which is used repeatedly during a text manifesting operation fetches the stored text characters in memory 174 in the order in which the characters appear in the sign text. In turn, a subinstruction 254 draws each of the strokes of the fetched character through the mapped memory system from the font data portion 194. The stroke information is converted into absolute positions embodied, for example, in a 32-bit command word for each coordinate axis, and the commands are then processed sequentially through the slant algorithm 258 which receives the slant tangent or degree information from the parameter data memory 176 in response to the set slant instruction 256. The slant algorithm performs a data modification on each absolute position data point above the base line b of the text as shown in FIG. 22, and shifts the point to the right (or left if a negative slant angle is ordered) by an amount proportional to the distance of the point above the base line and the tangent of the slant angle t set by the mahine operator during the data entry operation. As a result, each character is inclined slightly to the right (or left for a negative angle) from the base line position established by the width and spacing of the text characters. The overall effect gives the characters the appearance of italics.

With the text characters modified in accordance with the slant commands, the absolute data is then processed through a scaling algorithm 260 where the forced length and commanded height parameters from the data storage memory 176 modify the position data to scale the size of the characters in accordance with the commands. In the case of a forced length, the length factor F established by the algorithm in FIG. 20 operates upon the absolute position data and increases or decreases each of the coordinates in the base line direction associated with the feed roller so that the line of text fits within the forced length Lf. It will be understood that the length factor F is applied not only to the character data, but also to the kerns and spacing between characters to produce a proportioned expansion or contraction of the line from the first to the last character.

When the sign text is being proofed (key 160), another scaling factor is applied by the algorithm 260 to both the commanded height and length factors to reduce the line of text proportionally to a standard proofing height, for example one inch. This reduction enables the machine operator to review the text at a reduced scale and does not waste large quantities of material if several revisions are made.

The height adjustment is also applied in proportional relationship to each coordinate perpendicular to the base line direction to preserve the proportional relationship of the various characters in the text as established in the programmed font. However, the height factors and the length factors are applied independently so that an overall distortion of the programmed font can be created with different scale factors being used for the length and height.

The data processed by the command signal generator 250 through the slant and scale algorithms are absolute signals defining the absolute position of the cutting or plotting tool from an arbitrary origin established by the machine operator with the slewing switches 92. In addition to the absolute signals, a tool signal is also produced by the generator 250 to locate the tool either in its lowered position in engagement with the material or an elevated position out of engagement. It will be understood that the tool signals are a part of the information stored in the font data 194 since many alphanumeric characters are created by machine with tool down and tool up (dry-haul) strokes.

After the command signals have been modified with appropriate slant and scaling information, they are processed through a signal converter 262 which changes the absolute position data into incremental vectors that define the actual movements of the tool and material relative to one another. The incremental vectors are processed in a contouring control 264 which insures that the incremental commands are sequentially loaded into the buffer 266. The buffer in turn transmits the commands as required to a velocity generator 268 which establishes machine motion commands that correctly profile the text characters in accordance with standard servo and curve algorithms associated with the tool head 12 and the feed roller 20. The motion commands are processed through a double buffered input 270 to the machine control interface 178. The double buffering ensures that the tool and sheet material are moved relative to one another without interruption in the supply of command signals in spite of wide variations in the desired velocities and quantity of data that must be processed in order to maintain high resolution in the contours of the text characters. The machine control interface produces the servo signals applied to the drive motors 68, 80, 86 in a closed loop control system having both velocity and position feedback.

Accordingly, a sign generating apparatus has been disclosed which permits sign text to be composed, proofed in a reduced form and be drawn cut or outlined for pouncing in a sign material with the same positioning and spacing of the text characters as desired in the final product on a sign board or other object. The apparatus is capable of storing a plurality of fonts in read-only memories, and each of the fonts can be accessed through a mapped memory system. The sign generating apparatus based on a microprocessor design has many advantages over the prior art systems employing heated cutting dies. For example, from a single font of characters, a plurality of characters having different proportions, sizes and special effects such as slant, can be generated, whereas with the prior art machines, different sets of dies would be required for each variation. By operating the apparatus once with the plotting tool and again with the pouncing tool, a clear and visible outline of the perforations can be made on plotting paper. The machine is obviously far more compact than the die cutting machines and in one embodiment occupies a space no larger than a xerographic copying machine. The sign generating apparatus is also capable of compressing or expanding a line of text to fit within a prescribed area. The spacing of individual text characters can be adjusted to provide a more aesthetically appealing appearance in the finished product, and layout techniques permit different lines of text to be centered or justified at either left or right margins. All of the functions are performed automatically which eliminates the laborious layout process required with the prior art equipment. By simply selecting one switch or another, the sign text can be prepared in sign material adhesively secured to a release liner with either a direct-reading or a mirror image that previously required two separate sets of dies.

While the present invention has been described in a preferred embodiment, it should be understood that numerous modifications and substitutions can be employed without departing from the spirit of the invention. For example, although the machine has been described as containing a plurality of fonts stored in ROM memory, it will be understood that a disc or tape reader can be installed within the machine to accept an infinite number of fonts or designs for display in the sign. The interchangeable tool head is desirable in order to permit both proofing, cutting and pouncing a composed sign; however, a single purpose head which either plots, cuts or perforates a sign may be installed in the machine. Accordingly, the present invention has been described in a preferred embodiment by way of illustration rather than limitation.

We claim:

1. Apparatus for plotting and cutting large scale text in sheet materials for signs and the like comprising:
    movable support means for moving the sheet material back and forth in one coordinate direction during plotting and cutting operations including a rotatable feed roller having an axis of rotation and a work-engaging surface circumscribing the roller axis and against which the sheet material rests as plotting or cutting operations are carried out;
    a tool carriage supported adjacent the rotatable feed roller and movable relative to the roller in a second coordinate direction parallel to the roller axis;
    interchangeable cutting and plotting tools;
    a tool support movable on the tool carriage between an elevated and lowered position relative to the feed roller and having a tool mount accepting the interchangeable cutting and plotting tools one at a time for movement with the support between the elevated and lowered positions and into and out of working engagement with the sheet material on the roller;
    a lift motor mounted on the tool carriage and connected to the support for moving the support and the tool between the elevated and lowered positions;
    drive motor means connected with the tool carriage and the support means for moving the tool and the sheet material on the feed roller relative to one another;
    control means connected with the drive motor means and the lift motor for controlling the tool and sheet material movements during cutting and plotting operations; and including
    memory means for storing a font of text characters in terms of tool strokes suitable for moving both of the interchangeable cutting and plotting tools in the tool mount to trace on the material the profiles of each character in a sign text; and
    text entry means coupled with the memory means for selecting text characters in the font of the memory means and composing a desired sign text to be traced by any one of the interchangeable tools.

2. Apparatus for plotting and cutting large scale text as defined in claim 1 wherein the cutting tool comprises a heated stylus and the plotting tool comprises a marker; and the tool support includes means for supporting the heated needle and the marker interchangeably along a common tool axis perpendicular to the roller axis.

3. Apparatus for plotting and cutting as defined in claim 2 wherein the tool support comprises a lightweight platform connected to the tool carriage by means of a hinge having a hinge axis extending in a direction perpendicular to the common axis; and the heated needle mounts in the lightweight platform along the common axis to rest against and cut through a thin thermoplastic marker film adhesively secured to a paper liner without cutting the liner.

4. Apparatus for plotting and cutting as defined in claim 3 wherein the lift motor includes a rotary cam engaging the tool support to move the support between the elevated and lowered positions.

5. Apparatus for plotting and cutting large scale text as defined in claim 2 further including a knife blade cutting tool also mountable interchangeably with the heated cutting tool along the common tool axis in the tool support, the blade being mounted for rotation about the axis.

6. Apparatus for plotting and cutting large scale text as defined in claim 5 wherein the knife blade cutting tool is mounted for controlled rotation about the common axis and an orientation drive motor is connected with the blade for controlling the blade orientation about the axis.

7. Apparatus for plotting and cutting large scale text as defined in claim 1 further including a pouncing tool mountable interchangeably with the cutting and plotting tools in the mount of the tool support for perforating the sheet material.

8. An automated sign generator for laying out sign text comprising:
   support means having a support surface for holding sheet material on which sign text is generated in a visually perceptible form;
   a marking tool engageable with the sheet material on the support surface of the support means for marking the contours of text characters on the material;
   controlled motor means connected with the support means and the marking tool for moving the tool and the sheet material relative to one another to mark text characters on the sheet material;
   memory means for storing as preprogrammed data a font of text characters of uniform size in terms of strokes, and character spaces whereby the controlled motor means can produce relative movement of the sheet material and the marking tool in accordance with the preprogrammed data to manifest the characters;
   keying and storing means connected with the memory means for selecting characters from the stored font and composing a sign text for manifestion of the sign by the marking tool on the sheet material; and
   editing means for modifying the preprogrammed spacing of selected characters in the composed text of a sign to improve the text appearance in the manifested sign.

9. An automated sign generator as defined in claim 8 wherein the editing means comprises means incrementally back-spacing the second of two sequential characters in a composed text.

10. An automated sign apparatus as in claim 9 wherein the incremental back-spacing means has two spacing increments of different magnitude.

11. An automated sign generator for laying out text in a sign as defined in claim 8 wherein:
   the memory means for storing text characters includes a plurality of fonts of text characters;
   the controlled motor means includes a data processor having a limited number of data ports; and
   the memory means further includes mapping means permitting the processor to gain access to each of the fonts through the limited data ports.

12. An automated sign generator for laying out text in a sign as defined in claim 8 wherein the marking tool comprises cutting means for cutting text characters from the sheet material.

13. An automated sign generator for laying out text in a sign as defined in claim 8 wherein the marking tool comprises plotting means for plotting the text character contours on the sheet material.

14. An automated sign generator for laying out text in a sign as defined in claim 8 wherein the marking tool comprises pouncing means for marking the text character contours on the sheet material with a series of perforations.

15. Apparatus for cutting sign text in sheet material adhesively carried on an underlying release liner for transfer from the liner to a sign board or other object comprising:
   support means having a support surface for holding the sheet material and the underlying liner during a cutting operation;
   cutting means having a cutting tool suspended over the support surface and the sheet material on the release liner for cutting sign text characters as a group through the sheet material to the underlying liner;
   controlled motor means for moving the sheet material on the release liner and the cutting tool relative to one another as the tool cuts each sign text character through the sheet material to the liner;
   memory means having a ROM portion for storing vectors and other data defining a font of text characters for guiding the relative movement of the cutting tool and sheet material during the character cutting operations, the memory means also including a RAM portion for receiving and storing from the font in the ROM portion data defining a plurality of characters selected to compose the sign text to be cut by the tool during a sign cutting operation; and
   text entry means for selecting the text characters in the memory means and the character arrangement in a sign to be cut in the sheet material, and including a keyboard having keys corresponding to the text characters defined in the font stored in the ROM portion of the memory means, and associated interface means between the keyboard and memory means for storing the data defining the keyed characters composing a sign in the RAM portion of the memory means.

16. Apparatus for cutting sign text in a sheet material carried on a release liner as defined in claim 15 wherein the cutting tool comprises a heated stylus for cutting through thermoplastic sheet material to the release liner with heat.

17. Apparatus for cutting sign text in sheet material carried on a release liner as defined in claim 15 or 16 wherein:
   the support means includes a drive roller which engages the underlying release liner carrying the sheet material for movement in a first direction relative to the cutting tool; and
   the cutting means includes a tool carriage supporting the cutting tool for movement along the drive roller in a second direction orthogonal to the first direction whereby the sheet material may be cut along paths having components in the first and second directions.

18. Apparatus for cutting sign text in sheet material as defined in claim 15 wherein the memory means includes in the font of text characters a kern defining a back spacing vector, and the keyboard of the text entry means includes a corresponding kern key.

19. Apparatus for cutting sign text in sheet material carried on an underlying release liner as defined in claim 15 further including display means connected with the keyboard and interface means for displaying the text characters keyed from the board.

20. Apparatus for cutting sign text in sheet material adhesively carried on an underlying release liner as defined in claim 15 wherein the controlled motor means for moving the material and cutting tool relative to one another includes function control means having a first control enabling the text entry means without movement of the sheet material and cutting tool relative to one another and a second control enabling the movement of the sheet material and cutting tool relative to one another in accordance with the entered text.

21. Apparatus for cutting sign text in sheet material as defined in claim 20 further including in the function control means justifying means for displacing the cutting tool and sheet material relative to one another in accordance with the length of a line of text characters for central justification of multiple lines.

22. Apparatus for cutting sign text in sheet material as defined in claim 20 further including in the function control means a justifying means for displacing the cutting tool and sheet material by one half the length of the line of text characters for central and edge justification of multiple lines.

23. Apparatus for cutting sign text in sheet material as defined in claim 20 further including in the function control means an edit control enabling a programmed spacing of two text characters to be reduced.

24. Apparatus for cutting sign text in sheet material as defined in claim 15 wherein:
the text entry means includes a data processor having a limited logical address capacity; and
the ROM portion of the memory means comprises a mapped memory having a memory mapper accessing addressable memory stores with a greater number of addresses than the address capacity of the data processor in the text entry means.

25. Apparatus for cutting sign text in sheet material as defined in claim 24 wherein the mapped memory contains font data in both a mass storage portion containing detailed data defining the characters and an index portion identifying the addresses in the mass storage portion.

26. Apparatus for cutting sign text in sheet material as defined in claim 24 wherein the mapped memory contains data defining a plurality of fonts and each font has a number of addresses greater than the logical address capacity of the data processor.

* * * * *